United States Patent
Zeng et al.

(10) Patent No.: US 10,966,189 B2
(45) Date of Patent: Mar. 30, 2021

(54) HYBRID MULTI-SYNC-SIGNAL FOR WIDEBAND NR CARRIER

(71) Applicant: Apple Inc., Cupertino, CA (US)

(72) Inventors: Wei Zeng, San Diego, CA (US);
Yuchul Kim, Santa Clara, CA (US);
Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 1 day.

(21) Appl. No.: 16/706,911

(22) Filed: Dec. 9, 2019

(65) Prior Publication Data

US 2020/0112945 A1 Apr. 9, 2020

Related U.S. Application Data (63) Continuation of application No. 15/957,612, filed on Apr. 19, 2018, now Pat. No. 10,506,578.
(Continued)

(51) Int. Cl.
*H04W 4/00* (2018.01)
*H04W 72/04* (2009.01)
(Continued)

(52) U.S. Cl.
CPC .......... *H04W 72/042* (2013.01); *H04L 5/001* (2013.01); *H04W 48/16* (2013.01);
(Continued)

(58) Field of Classification Search
CPC ... H04W 72/042; H04W 48/16; H04W 76/28; H04W 56/001; H04L 5/001; H04L 5/005; H04L 5/0048
(Continued)

(56) References Cited

U.S. PATENT DOCUMENTS

| | | | |
|---|---|---|---|
| 10,306,681 | B2 | 5/2019 | Yi |
| 2011/0194515 | A1* | 8/2011 | Nakao ................ H04L 5/001 370/329 |

(Continued)

FOREIGN PATENT DOCUMENTS

| | | |
|---|---|---|
| CN | 104380820 | 2/2015 |
| CN | 105359585 | 2/2016 |

(Continued)

OTHER PUBLICATIONS

Apple, "Configuration of Synchronization and Tracking RS in wideband carrier", May 15-19, 2017. (From Applicant's IDS) (Year: 2017).*

(Continued)

*Primary Examiner* — Mang Hang Yeung
(74) *Attorney, Agent, or Firm* — Kowert, Hood, Munyon, Rankin & Goetzel, P.C.

(57) ABSTRACT

This disclosure relates to techniques for a base station (BS) to configure default and supplementary sync signals (SS) at sub-band bandwidths in a wireless communication system. The supplementary SS may be configured in response to a determination that the BS is in wireless communications with a UE using a single narrow band radio-frequency chain. The BS may configure the supplementary SS to be proximate in frequency to a PDCCH search space currently in use by the UE. The default SS may be configured to support initial access and may have a shorter periodicity, while the supplementary SS may be configured to not support initial access and may have a longer periodicity. The BS may additionally or alternatively configure a tracking reference signal (RS), wherein the tracking RS is configured on-demand based on a current network load of the BS. The tracking RS may be configured at a sub-band bandwidth, wherein the sub-band bandwidth is selected based on a
(Continued)

bandwidth allocated to an active UE in wireless communication with the BS.

20 Claims, 6 Drawing Sheets

Related U.S. Application Data (60) Provisional application No. 62/488,131, filed on Apr. 21, 2017.

(51) Int. Cl.
*H04L 5/00* (2006.01)
*H04W 76/28* (2018.01)
*H04W 56/00* (2009.01)
*H04W 48/16* (2009.01)

(52) U.S. Cl.
CPC ......... *H04W 56/001* (2013.01); *H04W 76/28* (2018.02); *H04L 5/005* (2013.01); *H04L 5/0048* (2013.01)

(58) Field of Classification Search
USPC .......................................... 370/329
See application file for complete search history.

(56) References Cited

U.S. PATENT DOCUMENTS

| | | | |
|---|---|---|---|
| 2011/0194639 A1* | 8/2011 | Nakao | H04L 5/001 375/267 |
| 2012/0099565 A1* | 4/2012 | Kim | H04L 5/001 370/336 |
| 2013/0039268 A1 | 2/2013 | Blankenship | |
| 2013/0114587 A1* | 5/2013 | Khoryaev | H04L 5/0037 370/343 |
| 2013/0322363 A1 | 12/2013 | Chen et al. | |
| 2015/0003434 A1 | 1/2015 | Shi et al. | |
| 2017/0195888 A1 | 7/2017 | Gou | |
| 2017/0238301 A1 | 8/2017 | Nakazawa | |
| 2017/0289965 A1 | 10/2017 | You et al. | |
| 2017/0311232 A1 | 10/2017 | Yi et al. | |
| 2017/0311355 A1 | 10/2017 | Yi et al. | |
| 2018/0062806 A1* | 3/2018 | Jung | H04J 11/0069 |
| 2018/0110019 A1* | 4/2018 | Ly | H04W 56/001 |
| 2018/0206253 A1* | 7/2018 | Yun | H04L 5/0091 |
| 2018/0270771 A1* | 9/2018 | Chendamarai Kannan | H04J 11/0073 |

FOREIGN PATENT DOCUMENTS

| | | |
|---|---|---|
| WO | 2015180551 A1 | 12/2015 |
| WO | WO 2016/048045 | 3/2016 |
| WO | 2016/068072 | 5/2016 |
| WO | 2017026754 A1 | 2/2017 |

OTHER PUBLICATIONS

Apple Inc.; "Configuration of Synchronization and Tracking RS in wideband carrier"; 3GPP TSG-RAN WG1 #89, R1-1708278; May 15-19, 2017; Hangzhou, China; 3 pages.

International Search Report and Written Opinion, Application No. PCT/US2018/028671, dated Jul. 6, 2018, 18 pages.

Intel Corporation; "Synchronization for Wearable and IoT Use Cases"; R1-1704704; 3GPP TSG RAN1 WG Meeting #88bis; Spokane, Washinton, USA; Apr. 3-7, 2017; 3 pages.

Appe Inc. "Configuration of Synchronization and Tracking RS in Wideband Carrier", 3GPP TSG-RAN WG1 #89 R1-1708278, May 15, 2017.

* cited by examiner

HYBRID MULTI-SYNC-SIGNAL FOR WIDEBAND NR CARRIER

PRIORITY CLAIM

This application is a continuation of U.S. patent application Ser. No. 15/957,612, entitled "Hybrid Multi-Sync Signal for Wideband NR Carrier" and filed Apr. 19, 2018, which claims priority to U.S. provisional patent application Ser. No. 62/488,131, entitled "Hybrid Multi-Sync Signal for Wideband NR Carrier," filed Apr. 21, 2017, which are both hereby incorporated by reference in their entirety as though fully and completely set forth herein.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

The present application relates to wireless communication, including to techniques for performing hybrid multi-sync signals for wireless communication.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others. Many such wireless communication standards provide for the use of known signals (e.g., pilot or reference signals) for a variety of purposes, such as synchronization, measurements, equalization, control, etc.

SUMMARY

Embodiments are presented herein of, inter alia, methods for configuring default and supplementary synchronization ("sync") signals in a cellular communication system, and of devices configured to implement the methods.

In some embodiments, a base station (BS) may configure a default sync signal (SS) within a carrier bandwidth. The BS may determine whether a user equipment device (UE) in wireless communication with the BS is in wireless communication with the BS using a single narrow-band radio-frequency (RF) chain. In response to a determination that the UE is in wireless communication with the BS using a single narrow band RF chain, the BS may configure a supplementary SS within the carrier bandwidth.

In some embodiments, the supplementary SS is configured proximate in frequency to a PDCCH search space currently in use by the UE, wherein the supplementary SS and the PDCCH search space are simultaneously monitorable by the narrow band RF chain of the UE.

In some embodiments, the default SS and the supplementary SS periodically repeat, and the supplementary SS has a larger period than the default SS. In some embodiments, the default SS supports initial access, while the supplementary SS does not support initial access.

In some embodiments, each of the default SS and the supplementary SS are configured at sub-band resolution.

In some embodiments, a base station (BS) configures a tracking reference signal (RS) on-demand based on a current network load of the BS. In some embodiments, the tracking RS is configured at a sub-band bandwidth, wherein the sub-band bandwidth is selected based on a bandwidth allocated to an active user equipment device (UE) in wireless communication with the BS.

In some embodiments, the tracking RS is configured with a duration that is selected based on a current DRX setting.

In other embodiments, a user equipment device (UE) configures the UE with a first sub-band radio frequency (RF) chain to monitor a PDCCH search space. The UE may further configure the UE with a second sub-band RF chain, wherein the second sub-band RF chain may be configured to periodically turn on to monitor a sync signal.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
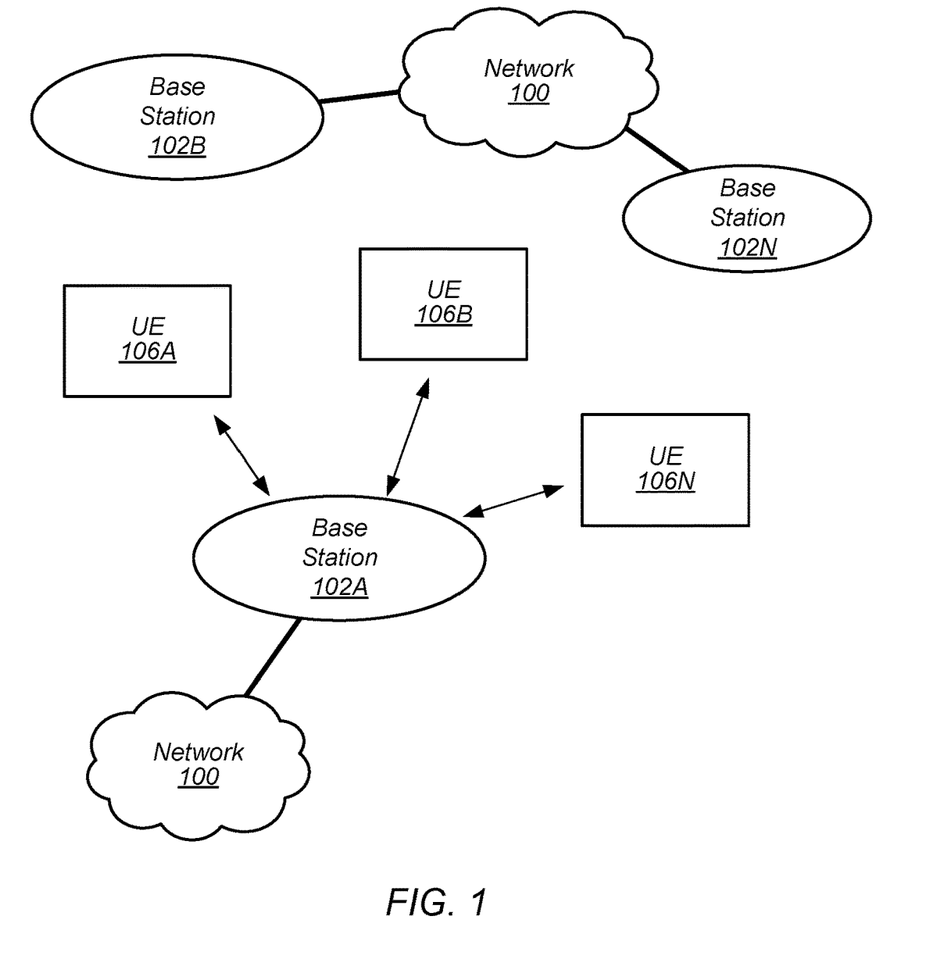
FIG. 1 illustrates an exemplary (and simplified) wireless communication system, according to some embodiments.
Figure 2:
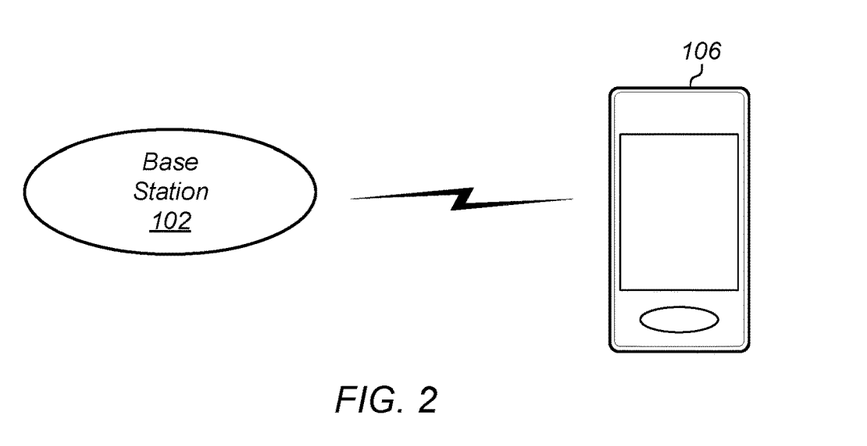
FIG. 2 illustrates a base station ("BS", or "eNodeB" or "eNB" in an LTE context) in communication with a user equipment ("UE") device, according to some embodiments.

FIGS. 1 and 2—Communication System

FIG. 1 illustrates an exemplary (and simplified) wireless communication system, according to one embodiment. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), HSPA, 3GPP2 CDMA2000 (e.g., 1×RTT, 1×EV-DO, HRPD, eHRPD), Wi-Fi, WiMAX, New Radio (NR), etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may provide a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1×RTT, 1×EV-DO, HRPD, eHRPD), etc.), NR. The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to one embodiment. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE, 1×RTT, and NR (or LTE or GSM), and separate radios for communicating using each of Wi-Fi and Bluetooth. Other configurations are also possible.

Figure 3:
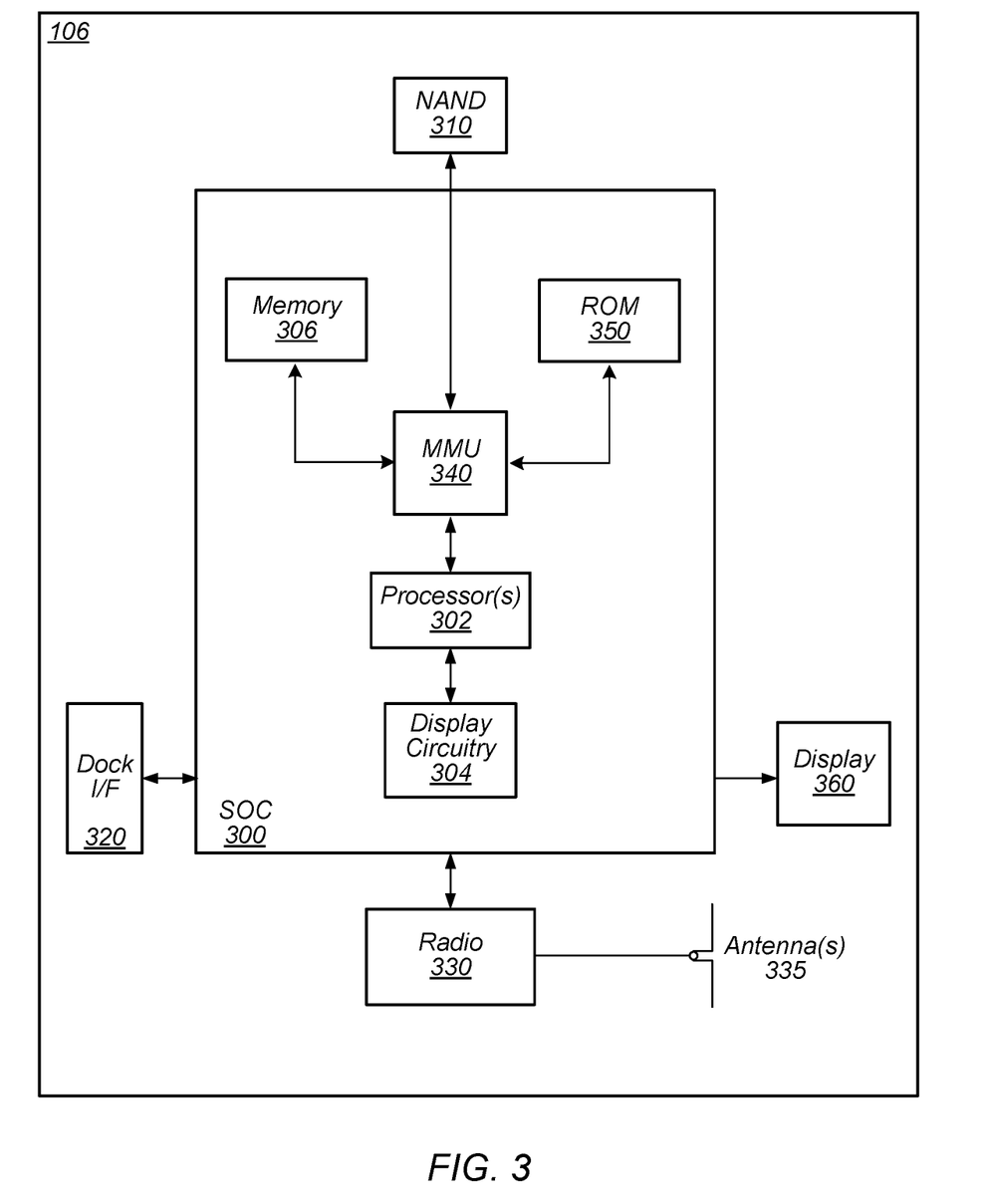
FIG. 3 illustrates an exemplary block diagram of a UE, according to some embodiments.

FIG. 3—Exemplary Block Diagram of a UE

FIG. 3 illustrates an exemplary block diagram of a UE 106, according to one embodiment. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (e.g., radio) 330 (e.g., for LTE, Wi-Fi, GPS, etc.).

The UE device 106 may include at least one antenna (and possibly multiple antennas, e.g., for MIMO and/or for implementing different wireless communication technologies, among various possibilities), for performing wireless communication with base stations and/or other devices. For example, the UE device 106 may use antenna(s) 335 to perform the wireless communication. As noted above, the UE 106 may be configured to communicate wirelessly using multiple wireless communication standards in some embodiments.

As described further subsequently herein, the UE 106 may include hardware and software components for implementing features relating to the use of dedicated measurement/synchronization subframes in a cellular communication system, such as those described herein with reference to, inter alia, FIG. 6. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 6.

Figure 4:
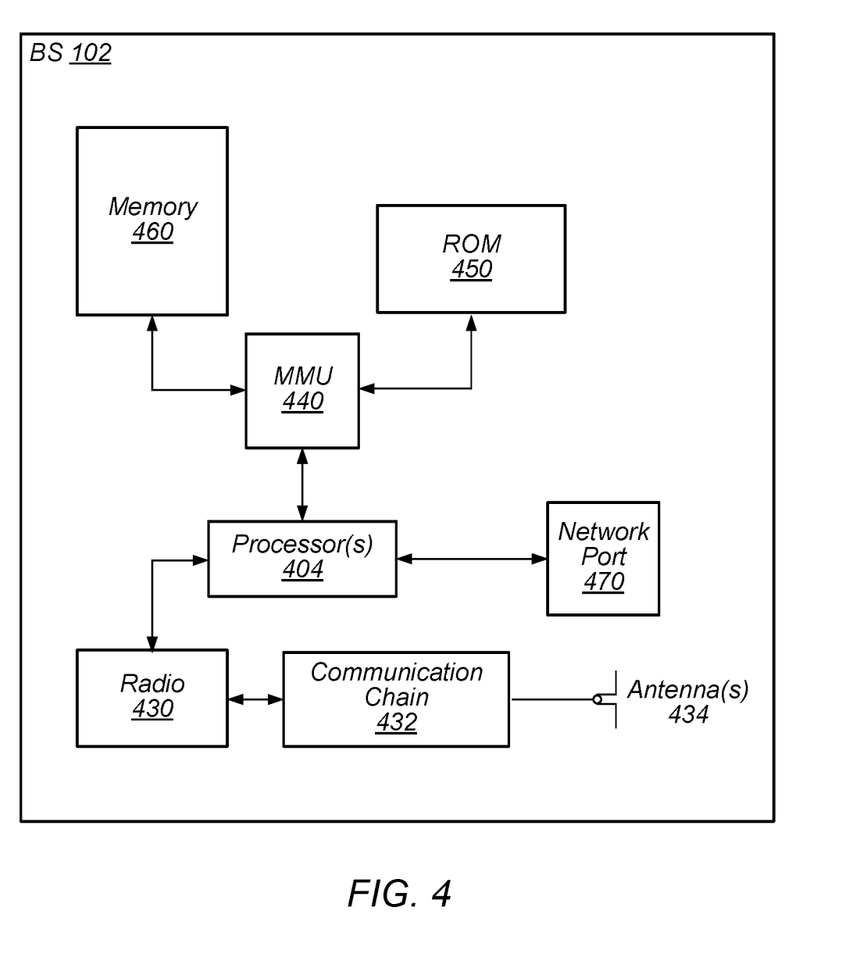
FIG. 4 illustrates an exemplary block diagram of a BS, according to some embodiments.

FIG. 4—Exemplary Block Diagram of a Base Station

FIG. 4 illustrates an exemplary block diagram of a base station 102, according to one embodiment. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, NR, LTE, LTE-A, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include a NR radio for performing communication according to NR as well as a Wi-Fi radio for performing communication according to Wi-Fi. In such a case, the base station 102 may be capable of operating as both a NR base station and a Wi-Fi access point. As another possibility, the base station 102 may include a multi-mode radio, which is capable of performing communications according to any of multiple wireless communication technologies (e.g., NR and Wi-Fi; NR and LTE; LTE and CDMA2000; UMTS and GSM; etc.).

As described further subsequently herein, the BS 102 may include hardware and software components for implementing features relating to the use of hybrid multi-sync signals for wideband carriers in a cellular communication system, such as those described herein with reference to, inter alia, FIGS. 6 and 7. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement part or all of the features described herein, such as the features described herein with reference to, inter alia, FIGS. 6 and 7.

Multiple RF Chains

It is anticipated that New Radio (NR) may support a much wider carrier bandwidth than LTE. For example, LTE has component carriers (CCs) up to 20 mHz in bandwidth, due to backward compatibility requirement to LTE Release 8 UEs. In addition, in LTE, a UE typically is required to monitor the entire bandwidth of the CC in order to communicate with a BS, since it needs to be able to access control information, scheduling information, payload information, etc., which is distributed throughout the bandwidth of the CC.

Figure 5:
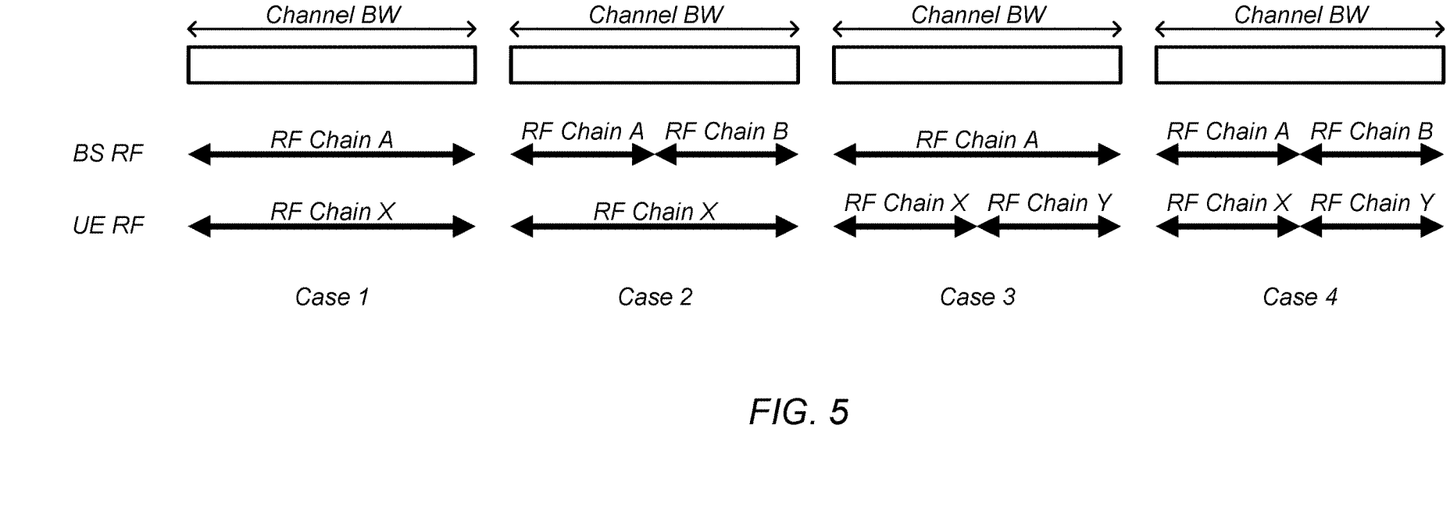
FIG. 5 illustrates various allocations of sub-band radio-frequency (RF) chains for a BS and a UE, according to various embodiments.

In contrast, it is expected (e.g., from 3GPP RAN1) that NR specifications will support a maximum of 400 Mhz on each CC for Rel. 15. (RAN1 #88). Due to cost/emission requirements, for some UEs, it may be challenging for the UE to cover the entire wide band carrier in NR with a single RF chain. FIG. 5 illustrates four potential RF chain allocations for a BS and a UE, according to various embodiments. As illustrated, case 1 shows both the BS and the UE having a single RF chain that covers the entire channel bandwidth (BW). Case 2 illustrates the case where the UE has a single RF chain to cover the entire channel BW, while the BS has two RF chains (RF chain A and RF chain B), which each cover half of the total channel BW. Case 3 illustrates a complementary case, wherein the BS employs a single RF chain to monitor the entire channel BW, while the UE employs two RF chains (RF chain X and RF chain Y) which each monitor half of the channel BW. Finally, case 4 illustrates the case where both the BS and the UE employ two RF chains each, wherein each RF chain monitors half of the channel BW. Other possibilities, i.e., with larger numbers of RF chains, are also possible, as desired.

In addition, some UEs/devices may only contain one RF chain that is narrower than the CC bandwidth (e.g., a narrow band RF chain). In other words, NR may support functionality wherein the UE does not monitor the entire bandwidth of the CC. For example, if the carrier bandwidth is 400 Mhz, some UEs may only have a single RF chain with a 100 Mhz bandwidth, such that they are not able to monitor the entire channel bandwidth. In some embodiments, a UE may be configured with an RF chain that adjustable to alternatively monitor the entire component carrier bandwidth or a bandwidth that is less than the component carrier bandwidth. For example, the RF chain may adjust its monitorable bandwidth based on current communication requirements, and may be configurable to function as a narrow band RF chain (e.g., to reduce power consumption). Throughout this disclosure, a "narrow band RF chain" may be taken to refer to any RF chain that is configurable to monitor a bandwidth less than the entire CC bandwidth associated with communications with a base station.

In LTE carrier aggregation (CA), each component carrier has its own sync signal (SS) and broadcast signal (called the physical broadcast channel, or PBCH). Typically, in LTE, a UE's RF chain is enough to cover the CC, and often even the whole band. The UE may simultaneously monitor the SS, the PBCH, as well as all the scheduling information in the physical downlink control channel (PDCCH).

In NR carrier aggregation, the CC bandwidth may be wider than the UE bandwidth. In other words, the UE may operate using a sub-band radio-frequency (RF) chain. Depending on the network (NW) loading, in some embodiments, a gNB may need to configure the UE to a different sub-band (i.e., to a different portion of the CC bandwidth) to monitor PDCCH in order to distribute the load.

In these embodiments, an issue arises as to how the NB UE reads the SS/PBCH while still monitoring the PDCCH search space. Various embodiments addressing this issue are discussed below.

Figure 6:
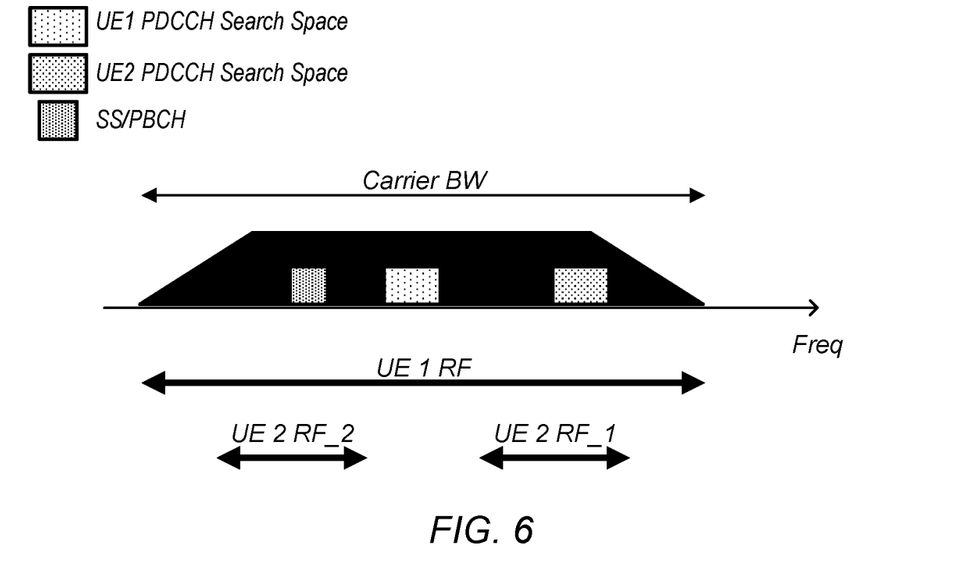
FIG. 6 illustrates a first UE configured with an RF chain that spans the entire carrier bandwidth (BW), and a second UE configured with two sub-band RF chains, according to various embodiments.

FIG. 6—UE with Multiple NB RF Chains

In some embodiments, as illustrated in FIG. 6, a UE may be configured with multiple RF chains. For example, the UE may use a first RF chain (UE 2 RF_1) to monitor its configured PDCCH search space. It may periodically turn on a second RF chain (UE 2 RF_2) to monitor SS/PBCH. For example, the second RF chain may be periodically used for tracking, measurement, or radio link monitoring, among other possibilities. Since the UE may only be required to monitor the SS/PBCH occasionally, the second RF chain may be turned off during times when it is not used, to avoid unnecessary battery drain. In contrast, in some embodiments, the first RF chain may be configured to stay on while monitoring the PDCCH search space. As illustrated, UE 1 has a single RF chain with a bandwidth that covers the entire carrier BW. Hence, UE may not require the configuration of a second RF chain.

Figure 7:
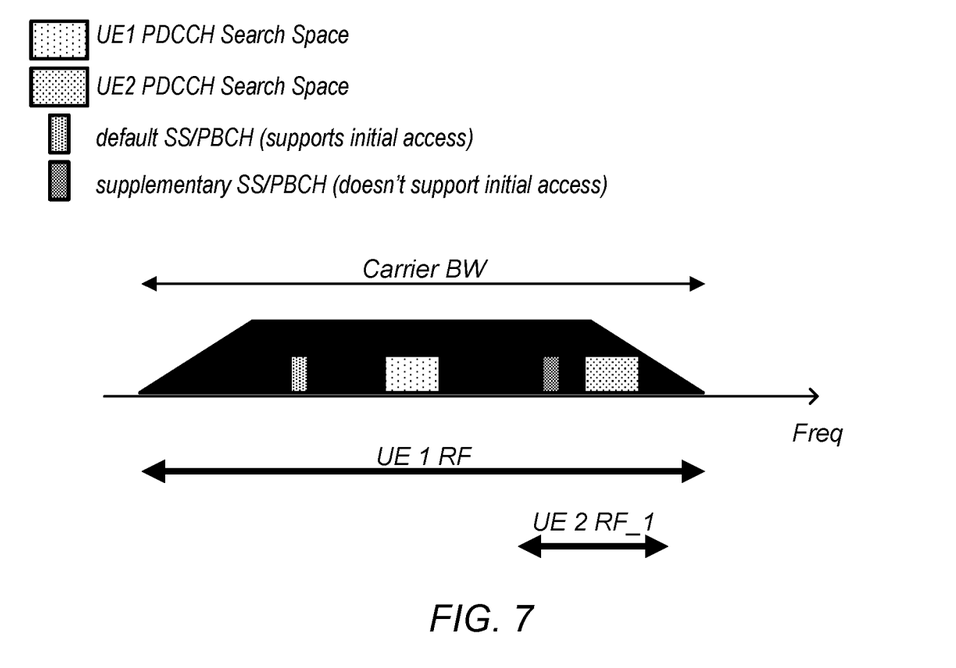
FIG. 7 illustrates default and supplementary sync signals configured within a carrier bandwidth, according to some embodiments.

FIG. 7—UE with One NB RF Chain

FIG. 7 illustrates another embodiment that employs a hybrid multi-sync signal (multi-SS). In this embodiment, the BS may configure a supplementary SS, such that a UE may use a single sub-band RF chain to simultaneously cover the SS and PDCCH search space.

As illustrated, a first UE has a single RF chain (UE 1 RF) that spans the entire bandwidth of the CC. A second UE, however, has a single RF chain (UE 2 RF_1) that has a limited bandwidth that can only monitor a portion of the overall carrier bandwidth.

In this embodiment, the BS may configure a default SS within the carrier bandwidth, which may be useable by the first UE with a wideband RF chain. Alternatively or in addition, the default SS may be useable by a UE similar to UE 2 in FIG. 6, which is configured with multiple sub-band RF chains (not shown in FIG. 7). The default SS may support initial access. In other words, the default SS may be configured to be useable by a UE when the UE wakes up and attempts an initial connection with the BS. The default SS may be configured to repeat periodically with a short period (e.g., 10 ms or another period), such that a UE attempting to connect to the BS will not have to wait long to receive the default SS.

While the default SS may be sufficient to serve the first UE with a wideband RF chain, the second UE with a single narrow-band RF chain may be unable to simultaneously monitor the default SS and a PDCCH search space. In this case, it may be desirable for the BS to determine whether a UE device in wireless communication with the BS is using a single narrow-band RF chain. For example, in some embodiments, the BS may receive communications from the UE that specify a hardware configuration or a current setting of the UE. Alternatively, the BS may determine that the UE is using a single narrow-band RF chain based on other characteristics of communications received from the UE. In response to a determination that a UE is in wireless communication with the BS using a single narrow band RF chain, the BS may configure a supplementary SS within the carrier bandwidth (e.g., the supplementary SS may be configured dynamically or semi-statically). In some embodiments, the supplementary SS may be selectively and/or dynamically configured based on need, e.g., depending on the current load of narrow band UEs with a single RF chain. In some embodiments, it may be selected where (in frequency) and when to configure the supplementary SS, based on characteristics of the UE (e.g., based on the UE's use of a single narrow band RF chain, based on the location of its allocated PDCCH search space, etc.).

In this embodiment, as illustrated, the BS may be configured to transmit a supplementary SS together with the PBCH, and the BS may be further configured to transmit the PDCCH search space dedicated to the second UE (UE2) in a nearby frequency, such that the limited bandwidth supported by the second UE's RF chain is able to monitor both the supplementary SS/PBCH and the UE2 PDCCH search space. The first UE (UE1), whose RF chain is able to monitor the entire carrier BW, may be able to monitor the default SS/PBCH as well as the UE1 PDCCH search space with its single wideband RF chain. In other embodiments, the supplementary SS may be transmitted separately from the PBCH.

In some embodiments, the supplementary SS may be configured to reduce the associated downlink (DL) overhead. For example, the supplementary SS may be configured at subband resolution (e.g. 100 Mhz), and may be configured only if there is need. In some embodiments, the supplementary SS may be configured to not support initial access, and may have much sparser periodicity than the main (default) SS, which may support initial access. For example, the default SS may be configured with a periodicity of 20 ms (or some other periodicity), while the supplementary SS may be configured with a periodicity of 100 ms (or some other periodicity that is longer than the default SS periodicity). In some embodiments, only one default SS supporting initial access may be needed per carrier.

When a UE initially attempts to connect to the network, it may be desirable for the UE to rapidly synchronize with the network to begin communications. In this case, the UE may monitor the default SS, which repeats more frequently because of its shorter periodicity. However, once the UE is synchronized, it may no longer be necessary for the UE to monitor a sync signal (e.g., the default SS) as often, in which case the UE may monitor the less frequent supplementary SS, hence saving battery life and alleviating unnecessary network load. In some embodiments, the network may inform the UE of the location in time and/or frequency of the supplementary SS, subsequent to the initial synchronization using the default SS. For example, the BS may transmit a notification to the UE specifying a periodicity and a measurement window of the supplementary SS. A further benefit may be that the network load for the control channels serving various UEs may be distributed in the supplementary SS throughout the bandwidth of the CC. In general, the network may configure supplementary SSs on demand or as needed, to avoid unnecessary use of network resources.

In some embodiments, the UE may be required to periodically resynchronize with the network. Without the supplementary SS, the UE may have to periodically retune to a frequency that is able to monitor the default SS. This may take extra time and cause an undesirable delay, and the UE may additionally miss payload data from the PDCCH search space while it is tuned away to the default SS. The presence of a supplementary SS alleviates these issues by allowing the UE to monitor the supplementary SS and the PDCCH search space simultaneously with a single short bandwidth RF chain.

In some embodiments, the UE may be informed of the periodicity of the supplementary SS, as well as the measurement window, e.g., by the base station. According to various embodiments, the supplementary SS may or may not be sent together with the PBCH. For embodiments where the supplementary SS is not sent together with the PBCH and, for example, the network needs to update a master information block (MIB), the network may request that the UE tunes in to the default SS to read the PBCH.

In some embodiments, multiple supplementary SSs may be configured for each of a plurality of UEs. For example, a supplementary SS may be configured on demand for each of the plurality of the UEs, wherein each supplementary SS is activated only when a UE requires access to the supplementary SS.

Figure 8:
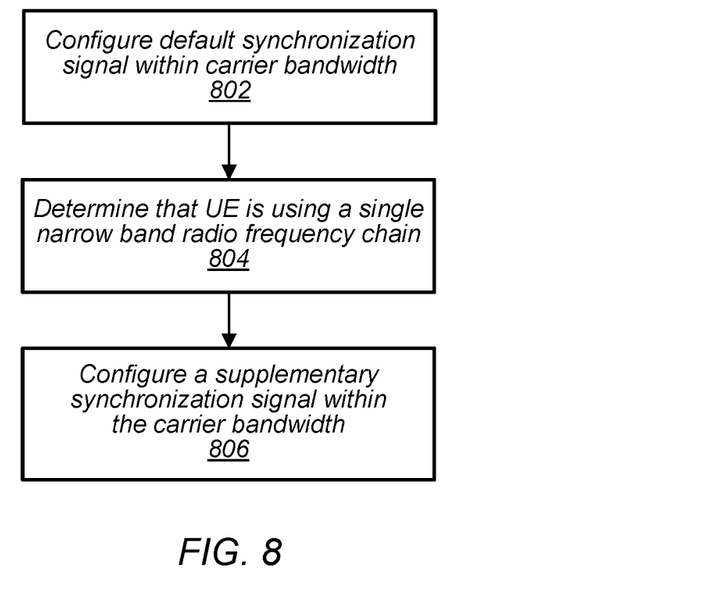
FIG. 8 is a flowchart diagram illustrating a method for configuring default and supplementary synchronization signals within a carrier bandwidth, according to some embodiments.

FIG. 8—Base Station Configuration of Supplementary SS

FIG. 8 is a flowchart diagram that describes a method for a base station to configure a supplementary SS. The steps illustrated in FIG. 8 present a high-level description of the methods described in reference to FIG. 7, according to some embodiments. Some of the method elements shown may be performed concurrently, in a different order than shown, or may be omitted. Additional method elements may also be performed as desired. As shown, the method may operate as follows.

At 802, the base station may configure a default SS within carrier bandwidth. The base station may initialize communication with a UE by transmitting the default SS to the UE.

At 804, the base station may determine that the UE is using a single narrow band radio frequency chain. The base station may make this determination based on a notification message received from the UE, or based on properties of other communications received from the UE (e.g., based on physical properties of a transmission received from the UE which indicates that the transmission is a narrow band transmission).

At 806, the base station may configure a supplementary SS within the carrier bandwidth. As described in greater detail above, the supplementary SS may be configured proximate in frequency to a PDCCH search space currently in use by the UE. The base station may transmit supplementary synchronization signals according to the configuration.

Figure 9:
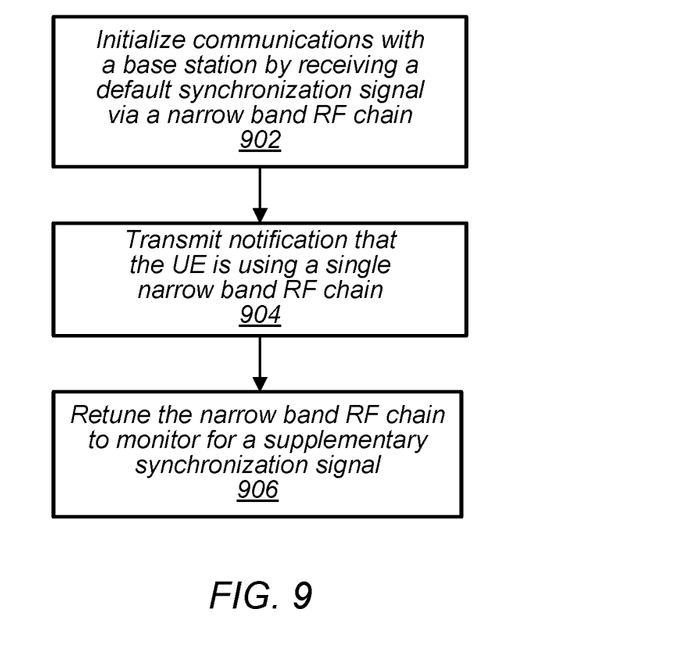
FIG. 9 is a flowchart diagram illustrating a method for retuning a narrow band RF chain to monitor for a supplementary synchronization signal, according to some embodiments.

FIG. 9—UE Utilization of Supplementary SS

FIG. 9 is a flowchart diagram that describes a method for a UE to utilize a supplementary SS. The steps illustrated in FIG. 9 present a high-level description of the methods described in reference to FIG. 7, according to some embodiments. Some of the method elements shown may be performed concurrently, in a different order than shown, or may be omitted. Additional method elements may also be performed as desired. As shown, the method may operate as follows.

At 902, the UE may initialize communications with a base station (BS) by receiving a default SS via a narrow band RF chain. The default SS may be received within the carrier bandwidth.

At 904, the UE may (optionally) transmit a notification to the base station that the UE is using a single narrow band RF chain. Alternatively, in some embodiments the base station may deduce that the UE is using a single narrow band RF chain based on physical properties of payload transmissions from the UE. In these embodiments, the UE may not be required to send a notification to the base station explicitly indicating that the UE is using a single narrow band RF chain.

At 906, the UE may retune the narrow band RF chain to monitor for a supplementary SS. The UE may receive a notification from the BS specifying a periodicity and measurement window associated with the supplementary SS. The UE may subsequently receive a supplementary SS via the retuned narrow band RF chain.

NR Tracking Reference Signals

In order to perform time and frequency tracking, cellular communication networks often use pilot or reference signals (RS) that are sufficiently dense and frequent. For example, in LTE, a cell-specific reference signal (CRS) may be used with a bandwidth that covers the entire bandwidth of the component carrier (e.g., 20 mHz), and which typically repeats every slot (i.e., every 0.5 ms).

It is likely that, to preserve network power, NR will not support "LTE-type" of cell-specific reference signals, which are "dense" in both time and frequency domains, and which span the whole channel bandwidth. In addition, NR sync signals may have a default periodicity of 20 ms (based on the current RAN1 agreement), which is slower than LTE's SS periodicity of 10 ms. In particular, a 20 ms periodicity may not be frequent enough for a tracking RS during peak data rates.

It may be desirable for NR to employ some type of reference signal for tracking purposes. Specifically, when transmitting at high spectral efficiency, a reference signal may be desirable with higher requirements for time/frequency accuracy. In some embodiments, the tracking RS will be a narrow band tracking RS. In some embodiments, as explained in further detail below, the tracking RS may be a periodic tracking RS that is optionally deployed on a sub-band basis.

On-Demand Tracking Reference Signal

In some embodiments, a tracking RS may be configured by the network. The tracking RS may have enough bandwidth in the frequency domain to achieve time tracking resolution. Alternatively or in addition, in some embodiments, the tracking RS may have enough density in the time domain to achieve frequency tracking range and/or resolution.

In some embodiments, the tracking RS may be configured on-demand (either semi-statically or dynamically) by the network to save power. For example, in some embodiments, the tracking RS may be turned on and off per sub-band or per carrier based on the current network loading. In some embodiments, the bandwidth of the tracking RS may be configured depending on the UEs' RF chain bandwidth. For example, if all active UEs are configured and/or allocated within a 50 Mhz sub-band, then the tracking RS may only need to be at most 50 Mhz in bandwidth. In some embodiments, the duration of the tracking RS may be configured based on a current DRX setting. For example, the network may only need to configure the tracking RS during the DRX on period and a few slots before the DRX on period.

The following numbered paragraphs describe additional embodiments of the invention.

In some embodiments, a base station (BS) configures a tracking reference signal (RS), wherein the tracking RS is configured on-demand based on a current network load of the BS.

In some embodiments, the tracking RS is configured at a sub-band bandwidth, wherein the sub-band bandwidth is selected based on a bandwidth allocated to an active user equipment device (UE) in wireless communication with the BS.

In some embodiments, a duration of the tracking RS is selected based on a current DRX setting.

In some embodiments, the tracking RS is configured become active at periodic intervals.

In some embodiments, a user equipment device (UE) configures the UE with a first sub-band radio frequency (RF) chain to monitor a PDCCH search space. The UE device may additionally configure the UE with a second sub-band RF chain, wherein the second sub-band RF chain is configured to periodically turn on to monitor a sync signal.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
    a radio, comprising an antenna configured for wireless communication;
    a processor operably coupled to the radio;
    wherein the UE is configured to:
        initialize communications with a base station (BS) by receiving, via a radio frequency (RF) chain configured to monitor a first bandwidth that is less than a component carrier bandwidth used in the communications, a default synchronization signal (SS) configured by the base station;
        after initializing communications with the BS, receive a configuration to monitor a second bandwidth that is less than the component carrier bandwidth and disjoint from the first bandwidth, wherein within the second bandwidth the UE monitors a supplementary SS via the RF chain, wherein the supplementary SS is configured sufficiently proximate in frequency to a physical downlink control channel (PDCCH) search space to allow the UE to monitor both the supplementary SS and the PDCCH via the RF chain.

2. The UE of claim 1, wherein the UE is further configured to:
    transmit a notification to the BS that the UE is conducting wireless communications with the BS using the RF chain that is configured to monitor the second bandwidth that is less than the component carrier bandwidth used in the communications, wherein said monitoring for the supplementary SS via the RF chain is performed after transmitting the notification.

3. The UE of claim 1, wherein the default SS and the supplementary SS periodically repeat, and wherein the supplementary SS has a longer period of repetition than the default SS.

4. The UE of claim 1, wherein the default SS supports initial access, and wherein the supplementary SS does not support initial access.

5. The UE of claim 1, wherein each of the default SS and the supplementary SS are configured at sub-band resolution.

6. The UE of claim 1, wherein the UE is further configured to:
receive a notification from the BS specifying a periodicity and measurement window associated with the supplementary SS.

7. The UE of claim 1, wherein the UE is further configured to:
receive the supplementary SS together with a physical broadcast channel (PBCH).

8. An apparatus configured for inclusion within a user equipment device (UE), the apparatus comprising:
a memory; and
a processor in communication with the memory, wherein the memory stores program instructions that are executable by the processor to cause the UE to:
initialize communications with a base station (BS) by receiving, via a radio frequency (RF) chain configured to monitor a first bandwidth that is less than a component carrier bandwidth used in the communications, a default synchronization signal (SS) configured by the base station; and
after initializing communications with the BS, receive a configuration to monitor a second bandwidth that is less than the component carrier bandwidth and disjoint from the first bandwidth, wherein within the second bandwidth the UE monitors a supplementary SS via the RF chain, wherein the supplementary SS is configured sufficiently proximate in frequency to a physical downlink control channel (PDCCH) search space to allow the UE to monitor both the supplementary SS and the PDCCH via the RF chain.

9. The apparatus of claim 8, wherein the program instructions are further executable by the processor to cause the UE to:
transmit a notification to the BS that the UE is conducting wireless communications with the BS using the RF chain that is configured to monitor the second bandwidth that is less than the component carrier bandwidth, wherein the supplementary SS is monitored via the RF chain after transmitting the notification.

10. The apparatus of claim 8, wherein the default SS and the supplementary SS periodically repeat, and wherein the supplementary SS has a different period of repetition than the default SS.

11. The apparatus of claim 8, wherein the default SS supports initial access, and wherein the supplementary SS does not support initial access.

12. The apparatus of claim 8, wherein the program instructions are further executable by the processor to cause the UE to:
receive a notification from the BS specifying a periodicity and measurement window associated with the supplementary SS.

13. The apparatus of claim 8, wherein each of the default SS and the supplementary SS are configured at sub-band resolution.

14. A method, comprising:
by a base station (BS):
configuring a default synchronization signal (SS), for initializing communications with the BS, within a first bandwidth that is less than a component carrier bandwidth used in the communications;
determining whether a user equipment device (UE) in wireless communication with the BS is in wireless communication with the BS using a single radio-frequency (RF) chain;
in response to a determination that the UE is in wireless communication with the BS using the single RF chain, configuring a supplementary SS within a second bandwidth that is less than the component carrier bandwidth and disjoint from the first bandwidth, wherein the supplementary SS is configured sufficiently proximate in frequency to a physical downlink control channel (PDCCH) search space to allow the UE to monitor both the supplementary SS and the PDCCH via the RF chain.

15. The method of claim 14, wherein the default SS and the supplementary SS periodically repeat, and wherein the supplementary SS has a different period of repetition than the default SS.

16. The method of claim 14, wherein the default SS supports initial access, and wherein the supplementary SS does not support initial access.

17. The method of claim 14, wherein each of the default SS and the supplementary SS are configured at sub-band resolution.

18. The method of claim 14, the method further comprising:
transmitting a notification to the UE specifying a periodicity and measurement window associated with the supplementary SS.

19. The method of claim 14, the method further comprising:
transmitting the supplementary SS together with a physical broadcast channel (PBCH).

20. The method of claim 14,
wherein determining whether the UE is in wireless communication with the BS using the single RF chain comprises receiving a notification from the UE that the UE is conducting wireless communications with the BS using the single RF chain that is configured to monitor the second bandwidth.

* * * * *